US009025211B2

(12) United States Patent
Miura et al.

(10) Patent No.: US 9,025,211 B2
(45) Date of Patent: May 5, 2015

(54) IMAGE READING APPARATUS

(71) Applicants: Katsuro Miura, Toyota (JP); Yasuo Nishikawa, Nagoya (JP); Takuya Naniwa, Kiyosu (JP)

(72) Inventors: Katsuro Miura, Toyota (JP); Yasuo Nishikawa, Nagoya (JP); Takuya Naniwa, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/934,416

(22) Filed: Jul. 3, 2013

(65) Prior Publication Data

US 2014/0009799 A1    Jan. 9, 2014

(30) Foreign Application Priority Data

Jul. 6, 2012 (JP) .................................. 2012-153071

(51) Int. Cl.
*H04N 1/04* (2006.01)
*H04N 1/00* (2006.01)

(52) U.S. Cl.
CPC ........ *H04N 1/00559* (2013.01); *H04N 1/00551* (2013.01); *H04N 1/0083* (2013.01)

(58) Field of Classification Search
CPC ............ H04N 2201/0241; H04N 2201/02412; H04N 2201/02435; H04N 2201/02445; H04N 2201/02462; H04N 2201/02468; H04N 2201/02485; H04N 2213/001; H04N 5/225; H04N 5/2253; H04N 5/2254; H04N 5/23203
USPC .......... 358/474, 498, 496, 497, 486; 399/100, 399/171, 90, 221, 266, 328, 34, 88
See application file for complete search history.

(56) References Cited

U.S. PATENT DOCUMENTS

| 5,566,048 | A | | 10/1996 | Esterberg et al. | |
|---|---|---|---|---|---|
| 5,633,732 | A | * | 5/1997 | Ishizuka | 358/474 |
| 5,970,288 | A | * | 10/1999 | Nanba et al. | 399/211 |
| 6,067,174 | A | * | 5/2000 | Hayashi | 358/497 |
| 6,204,936 | B1 | * | 3/2001 | Ishizuka | 358/474 |
| 6,717,702 | B1 | * | 4/2004 | Yamauchi et al. | 358/497 |
| 6,791,719 | B1 | * | 9/2004 | Hisada | 358/473 |
| 6,909,048 | B2 | * | 6/2005 | Yamanaka et al. | 174/68.1 |
| 7,116,451 | B2 | * | 10/2006 | Chang | 358/497 |

(Continued)

FOREIGN PATENT DOCUMENTS

| JP | 2003-051683 A | 2/2003 |
|---|---|---|
| JP | 2007-300352 A | 11/2007 |

(Continued)

OTHER PUBLICATIONS

Copending U.S. Appl. No. 14/085,985, filed Nov. 21, 2013.

(Continued)

*Primary Examiner* — Negussie Worku
(74) *Attorney, Agent, or Firm* — Banner & Witcoff, Ltd.

(57) ABSTRACT

An image reading apparatus includes: a housing; a cover pivotable with respect to the housing about a first pivot axis extending in first directions that are opposite each other; a first electric component provided in the housing; a second electric component provided in the cover; and an electric wire configured to connect the first electric component and the second electric component to each other. The electric wire includes: a first extending portion retained by the cover and extending in the first directions; and a second extending portion movable relative to the cover and extending from the first extending portion toward the housing.

21 Claims, 16 Drawing Sheets

(56) References Cited

U.S. PATENT DOCUMENTS

| 7,751,100 | B2* | 7/2010 | Chang | 358/497 |
|---|---|---|---|---|
| 7,824,200 | B2 | 11/2010 | Bryla et al. | |
| 7,982,923 | B2* | 7/2011 | Andoh et al. | 358/474 |
| 8,537,437 | B2 | 9/2013 | Takeuchi et al. | |
| 8,724,181 | B2* | 5/2014 | Fujiwara | 358/474 |
| 2011/0242621 | A1 | 10/2011 | Takeuchi et al. | |
| 2012/0119432 | A1 | 5/2012 | Kambayashi et al. | |
| 2013/0255989 | A1 | 10/2013 | Ito | |

FOREIGN PATENT DOCUMENTS

| JP | 2011-211595 A | 10/2011 |
|---|---|---|
| JP | 2012-082031 A | 4/2012 |
| JP | 2012-153071 A | 8/2012 |

OTHER PUBLICATIONS

Sep. 15, 2014—(US) Notice of Allowance—U.S. Appl. No. 14/085,985.

* cited by examiner

IMAGE READING APPARATUS

CROSS REFERENCE TO RELATED APPLICATION

The present application claims priority from Japanese Patent Application No. 2012-153071, which was filed on Jul. 6, 2012, the disclosure of which is herein incorporated by reference in its entirety.

BACKGROUND OF THE INVENTION

1. Field of the Invention

The present invention relates to an image reading apparatus configured to read an image formed on a document.

2. Description of the Related Art

There is known an image reading apparatus including a main body and a document cover that is openable and closable with respect to the main body. A contact glass is disposed on an upper face of the main body. A reading unit is provided under the contact glass. The document cover is pivotable about a pivot axis to expose or cover an upper face of the contact glass.

After the document cover is opened, a document is placed on the contact glass, and the document cover is closed. In this state, the contact glass is covered with the document cover, with the document pressed on the contact glass. As a result, the document can be held in close contact with a document table. While moving at a predetermined speed in this state, the reading unit emits light onto the document placed on the contact glass. Light reflected from the document is received by an image sensor of the reading unit, so that reading of an image formed on the document is completed.

This image reading apparatus may include an auto document feeder (ADF) for automatically supplying a document placed on the document cover, onto the document table. In such an image reading apparatus, one end of a harness is connected to an electric component such as a motor provided in the document cover. The other end portion of the harness extends toward a main body side of the image reading apparatus, and the other end of the harness is connected to a control board provided for controlling components of the image reading apparatus.

The document cover is provided with a retaining shaft extending parallel to the pivot axis for the document cover. In the closed state of the document cover, the harness drawn to an outside of the document cover is bent along an upper portion of an outer circumferential face of the retaining shaft so as to form a U-shape and extends downward toward the main body side. When the document cover is opened, the U-shaped portion of the harness is straightened. This movement of the harness does not hinder the document cover from opening and closing.

SUMMARY OF THE INVENTION

However, the bending (flexing) and straitening (stretching) of the harness are repeated above the retaining shaft in accordance with the opening and closing of the document cover, causing stress concentration on the portion of the harness which is bent along the upper portion of the retaining shaft. That is, the portion of the harness gets fatigued easily, leading to a broken wire in the harness. If a degree of bending of the bent portion of the harness is made larger, the stress concentration of the harness can be reduced, but the size of the image reading apparatus is increased.

This invention has been developed to provide an image reading apparatus capable of reducing stress concentration of a harness caused by opening and closing of a cover without increase in size of the image reading apparatus.

The present invention provides an image reading apparatus, comprising: a housing; a cover pivotable with respect to the housing about a first pivot axis extending in first directions that are opposite each other; a first electric component provided in the housing; a second electric component provided in the cover; and an electric wire configured to connect the first electric component and the second electric component to each other, the electric wire comprising: a first extending portion retained by the cover and extending in the first directions; and a second extending portion movable relative to the cover and extending from the first extending portion toward the housing.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Hereinafter, there will be described one embodiment of the present invention by reference to the drawings.

<External Structure of MFP>

Figure 1:
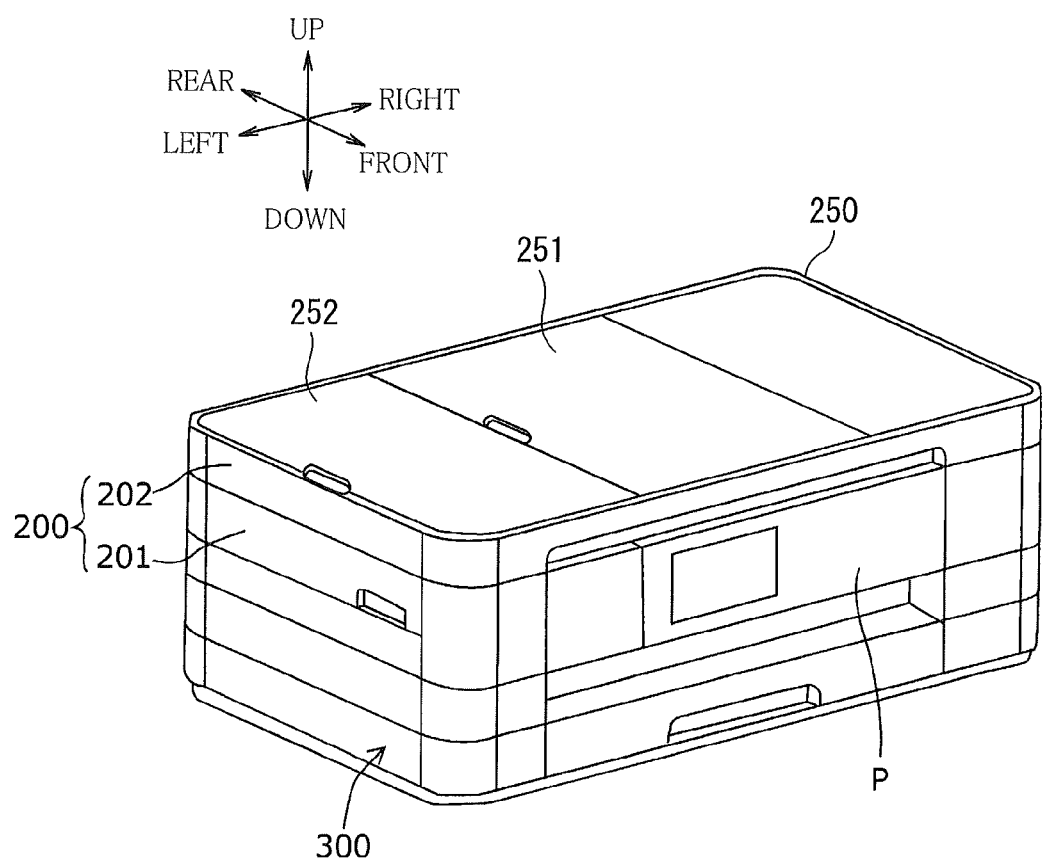
FIG. 1 is a perspective view illustrating a multi-function peripheral (MFP) 100 including an image reading device 200 according to one embodiment of the present invention, when viewed from the upper front left side, with an ADF 202 being closed.

As illustrated in FIG. 1, an MFP 100 has a generally rectangular parallelepiped shape. The MFP 100 includes an image reading device 200 as one example of an image reading apparatus, and an image forming device 300 disposed under the image reading device 200.

It is noted that in a state in which the MFP 100 is placed on a horizontal surface, lengthwise directions of the MFP 100 in plan view are defined as right and left directions. Also, directions perpendicular to up and down directions and the lengthwise directions of the MFP 100 in plan view are defined as front and rear directions. Each direction is indicated by an arrow in each figure.

The image reading device 200 has a generally rectangular parallelepiped flat shape. The image reading device 200 includes an image reading main body 201 as one example of a housing, and an auto document feeder (ADF) 202.

The image reading main body 201 is provided with a contact glass 206 (see FIG. 2) and includes a contact image sensor (CIS) unit for reading an image of a document.

The ADF 202 is provided over or above the image reading main body 201. The ADF 202 is provided with a hinge member 462. The hinge member 462 is fitted in a recessed portion 201A of the image reading main body 201, whereby the ADF 202 is set on the image reading main body 201. The hinge member 462 connects the image reading main body 201 and the ADF 202 to each other, allowing pivotal movement therebetween. The ADF 202 is pivotable about an axis AX between a closed position illustrated in FIG. 1 and an open position illustrated in FIG. 2. The axis AX extends in the right and left directions near an upper rear end of the image reading main body 201. In the closed position, the ADF 202 is superposed on the image reading main body 201. In the open position, the ADF 202 is open with respect to the image reading main body 201, with a front portion of the ADF 202 being raised.

The image forming device 300 has a generally rectangular parallelepiped shape. A front face of the image forming device 300 has an upper portion provided with an operation panel P that is operated by a user. The image forming device 300 includes an ink jet or electro-photographic image forming device having a printing function.

<Structure of ADF>

As illustrated in FIG. 1, the ADF 202 includes an ADF housing 250, a tray 251, and a maintenance cover 252.

The ADF housing 250 is a generally rectangular parallelepiped flat shape.

The tray 251 is provided on a central portion of an upper face of the ADF housing 250 in the right and left directions. The tray 251 has a generally rectangular shape in plan view. The tray 251 is opened and closed by its pivotal movement about an axis extending in the front and rear directions. In the closed state, an outer face of the tray 251 serves as a portion of an upper face of the ADF housing 250. When the tray 251 is opened from the closed state, a left end portion of the tray 251 being in the closed state is raised, so that the tray 251 is pivoted rightward. In the open state, the tray 251 extends in an upper right direction as illustrated in FIG. 3.

As illustrated in FIG. 1, the maintenance cover 252 is provided on a left end portion of the upper face of the ADF housing 250. The maintenance cover 252 has a rectangular shape in plan view. The maintenance cover 252 is opened and closed by its pivotal movement about an axis extending in the front and rear directions. In the closed state, an outer face of the maintenance cover 252 serves as a portion of the upper face of the ADF housing 250. In the open state, the maintenance cover 252 extends in an upper left direction as illustrated in FIG. 3.

<Structure for Conveying Document>

Figure 3:
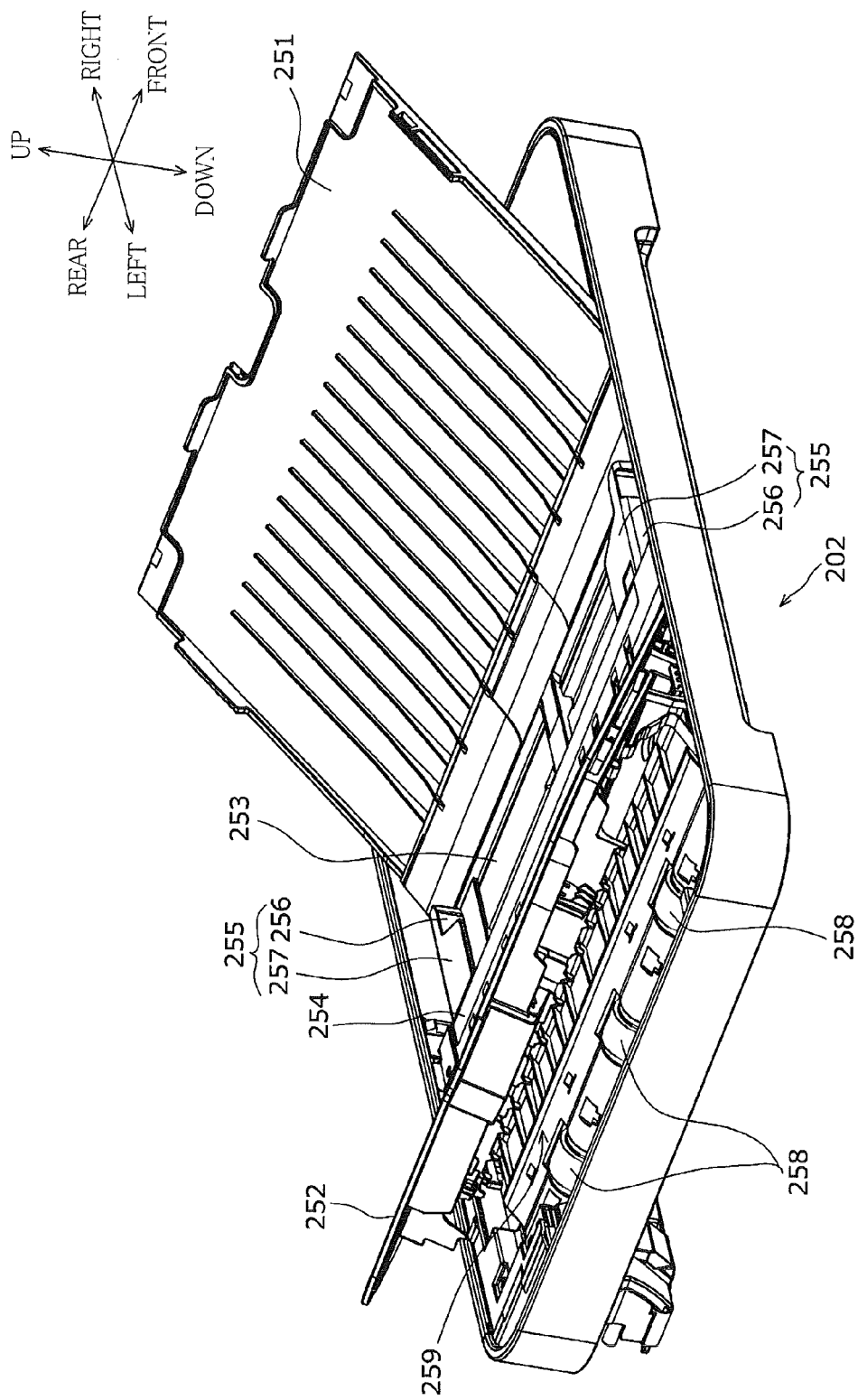
FIG. 3 is a perspective view illustrating the ADF 202 when viewed from the upper front left side, with a tray 251 and a maintenance cover 252 being opened.

As illustrated in FIG. 3, the ADF 202 includes a document feeder 253 and a document discharger 254 that are exposed when the tray 251 is opened.

The document feeder 253 is located below the document discharger 254. A right end portion of an upper face of the document feeder 253 is connected to an inner face of the tray 251 being in the open state, with a small space therebetween.

The document feeder 253 is provided with a pair of document width guides 255. The pair of document width guides 255 face each other in the front and rear directions. Each of the document width guides 255 includes a guide wall 256 and a roof 257. The guide wall 256 stands upright on the upper face of the document feeder 253. The roof 257 extends inward from an upper end edge of the guide wall 256 in the front and rear directions. The pair of document width guides 255 are movable toward and away from a central position therebetween by the same moving amount.

The document discharger 254 is provided above the document feeder 253, with a space therebetween. The document discharger 254 is shaped like a rectangular plate that expands in the front and rear directions and the right and left directions.

Three LF rollers 258 are rotatably provided and exposed when the maintenance cover 252 is opened. The three LF rollers 258 are supported on a shaft, not shown, extending in the front and rear directions. The three LF rollers 258 are arranged spaced apart from each other in the front and rear directions.

A guide member 259 is provided between the document discharger 254 and an uppermost portion of an outer circumferential face of each LF roller 258 so as to expand over portions of the document discharger 254 and the LF rollers 258.

When the ADF 202 is used, that is, when the document having a sheet-like shape is conveyed, a distance between the pair of document width guides 255 is adjusted to the width of the document. The document is placed onto a position between the pair of document width guides 255 from a right side thereof, so that the document is positioned on the document feeder 253 and the tray 251, with a center of the document being aligned to the center of the pair of document width guides 255.

The document placed on the document feeder 253 and the tray 251 is pulled leftward from the document feeder 253 by a document supply roller, not shown, and conveyed toward on a lower side of the LF rollers 258. The document is conveyed along the outer circumferential faces of the LF rollers 258 and makes a U-turn, that is, a conveying direction of the document is switched from the left direction to the right direction. The document is then conveyed rightward on the guide member 259 and discharged onto the document discharger 254. A leading edge portion of the document is moved over the document discharger 254 and placed on the roofs 257 or the tray 251. A trailing edge portion of the document is placed on the document discharger 254 or the roofs 257. It is noted that since the roofs 257 of the document width guides 255 are located just above a document placed on the document feeder 253, the document discharged and placed on the document discharger 254 and the tray 251 and the document not having been conveyed yet and placed on the document feeder 253 and the tray 251 are not mixed together.

<Drive Frame>

The ADF housing 250 is provided at its rear left end portion with a drive frame 261 illustrated in FIGS. 4, 5, 6, and 7.

Figure 6:
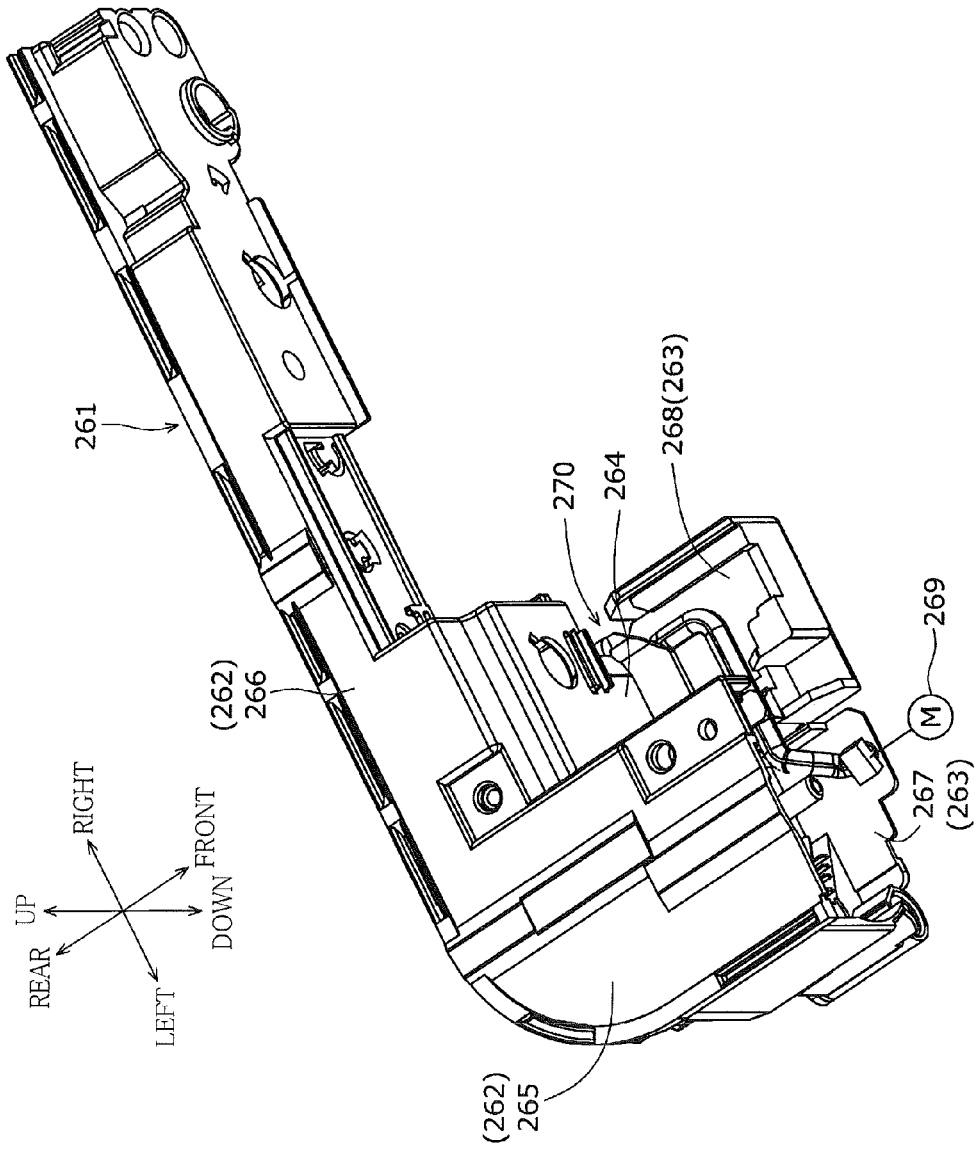
FIG. 6 is a perspective view illustrating the drive frame 261 when viewed from the upper front left side.
Figure 7:
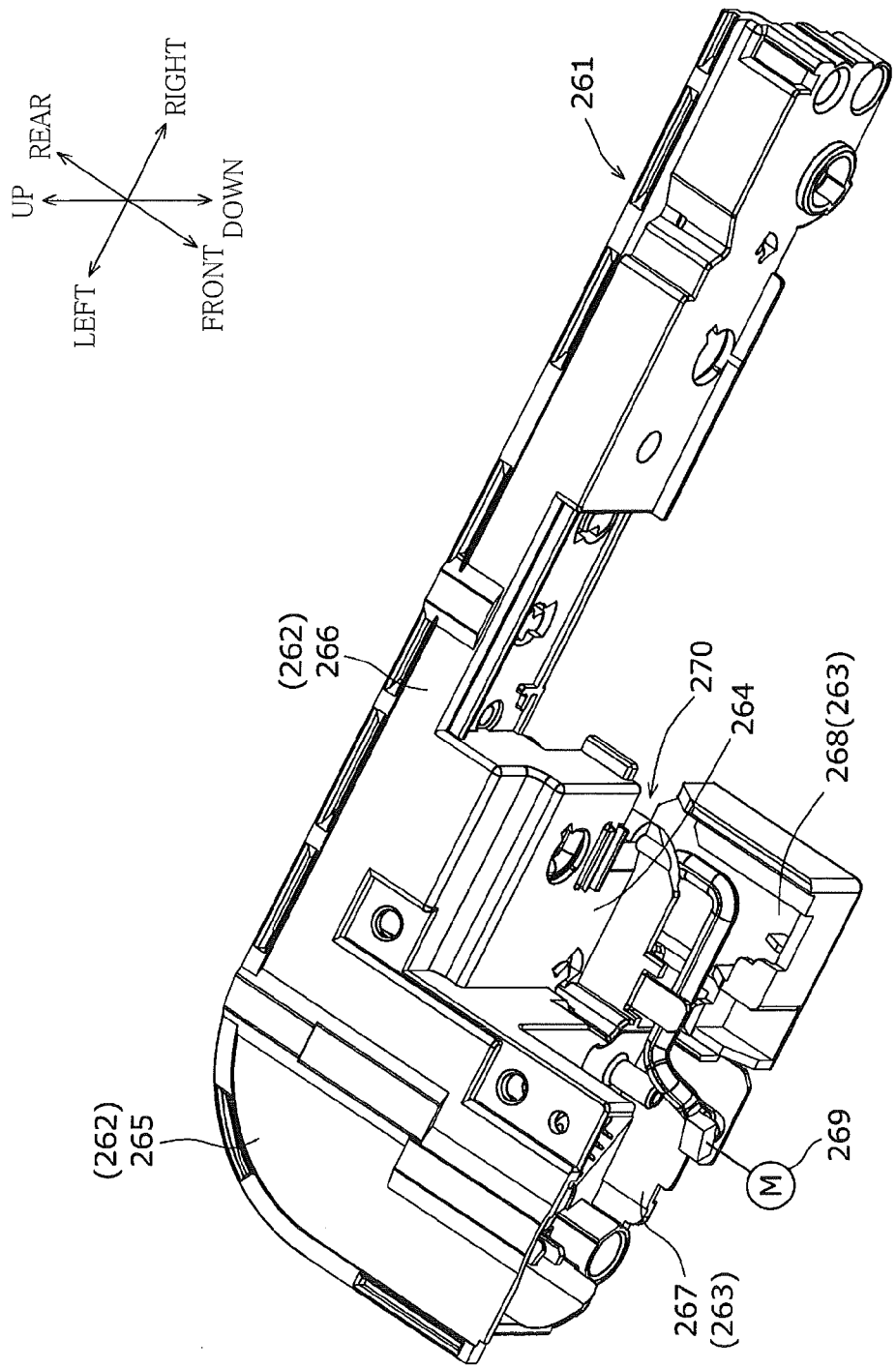
FIG. 7 is a perspective view illustrating the drive frame 261 when viewed from the upper front right side.

As illustrated in FIGS. 6 and 7, the drive frame 261 includes an upper face portion 262, a bottom face portion 263, and a wall portion 264.

The upper face portion 262 integrally includes: an upper left face portion 265 extending in the front and rear directions; and an upper rear face portion 266 extending rightward from a rear end portion of the upper left face portion 265.

The bottom face portion 263 is provided under the upper face portion 262, with a space therebetween. The bottom face portion 263 integrally includes: a left bottom face portion 267 that overlaps the upper left face portion 265 in plan view; and a front bottom face portion 268 having a rectangular shape in plan view and extending from a front end portion of the left bottom face portion 267. Disposed in front of the left bottom face portion 267 in the ADF housing 250 is a motor 269 as one example of a second electric component that generates a force for driving components such as the LF rollers 258. It is noted that the motor 269 is disposed in a space (as one example of a first space) located in front of a harness routing portion 446 which will be described below and to the left of a cutout 452 which will be described below.

The wall portion 264 stands upright on a rear edge of the front bottom face portion 268 and is connected to a front edge of the upper rear face portion 266. A rectangular cutout portion 270 is formed in a lower end portion of the wall portion 264. The cutout portion 270 is formed by cutting out the wall portion 264 leftward from its right edge, so that the cutout portion opens rightward.

<Harness Support>

Figure 4:
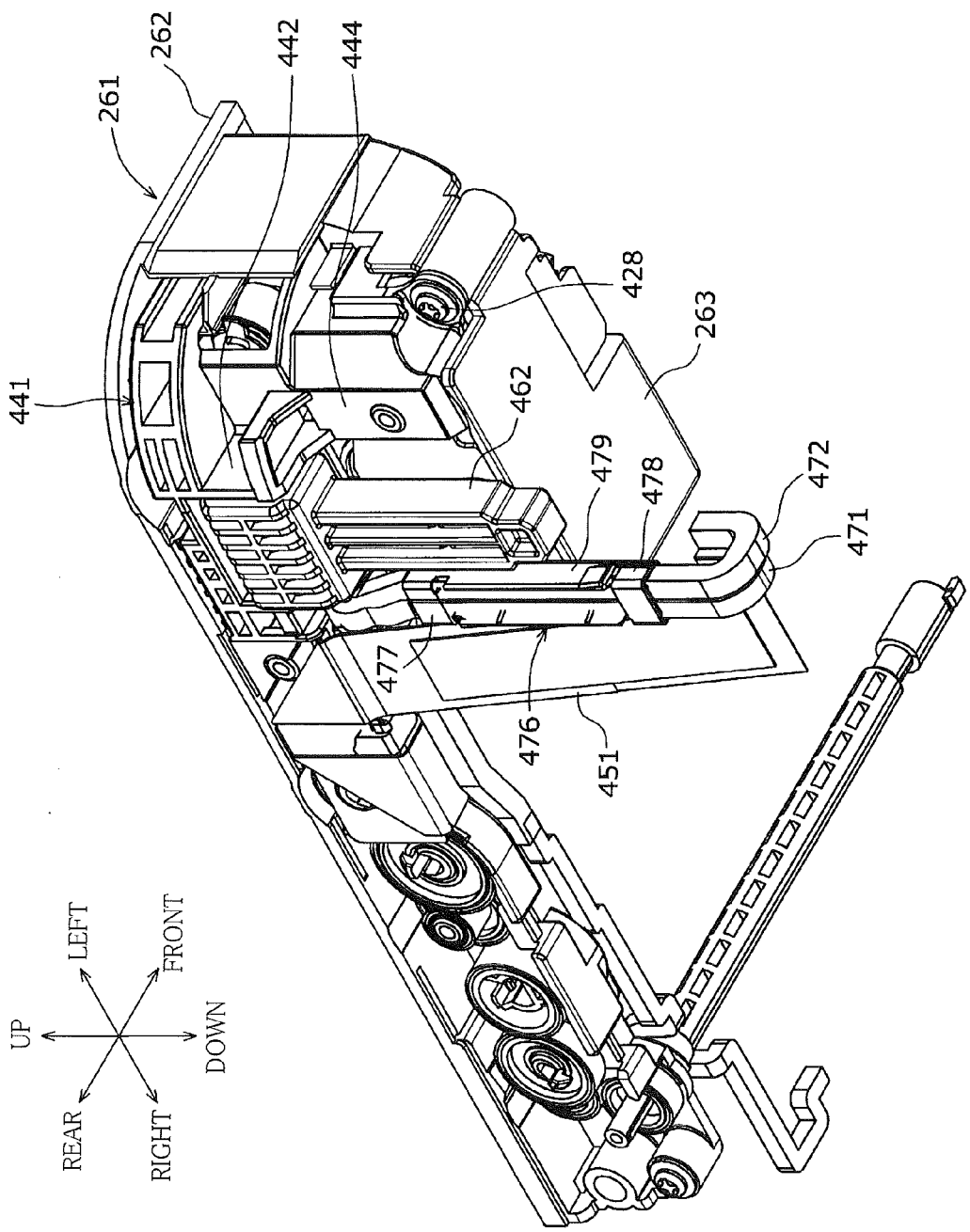
FIG. 4 is a perspective view illustrating a drive frame 261 of the ADF 202 when viewed from the lower rear left side, with harnesses 471, 472 and an FFC 451 being routed and a harness support 441 and a hinge member 462 being provided.
Figure 5:
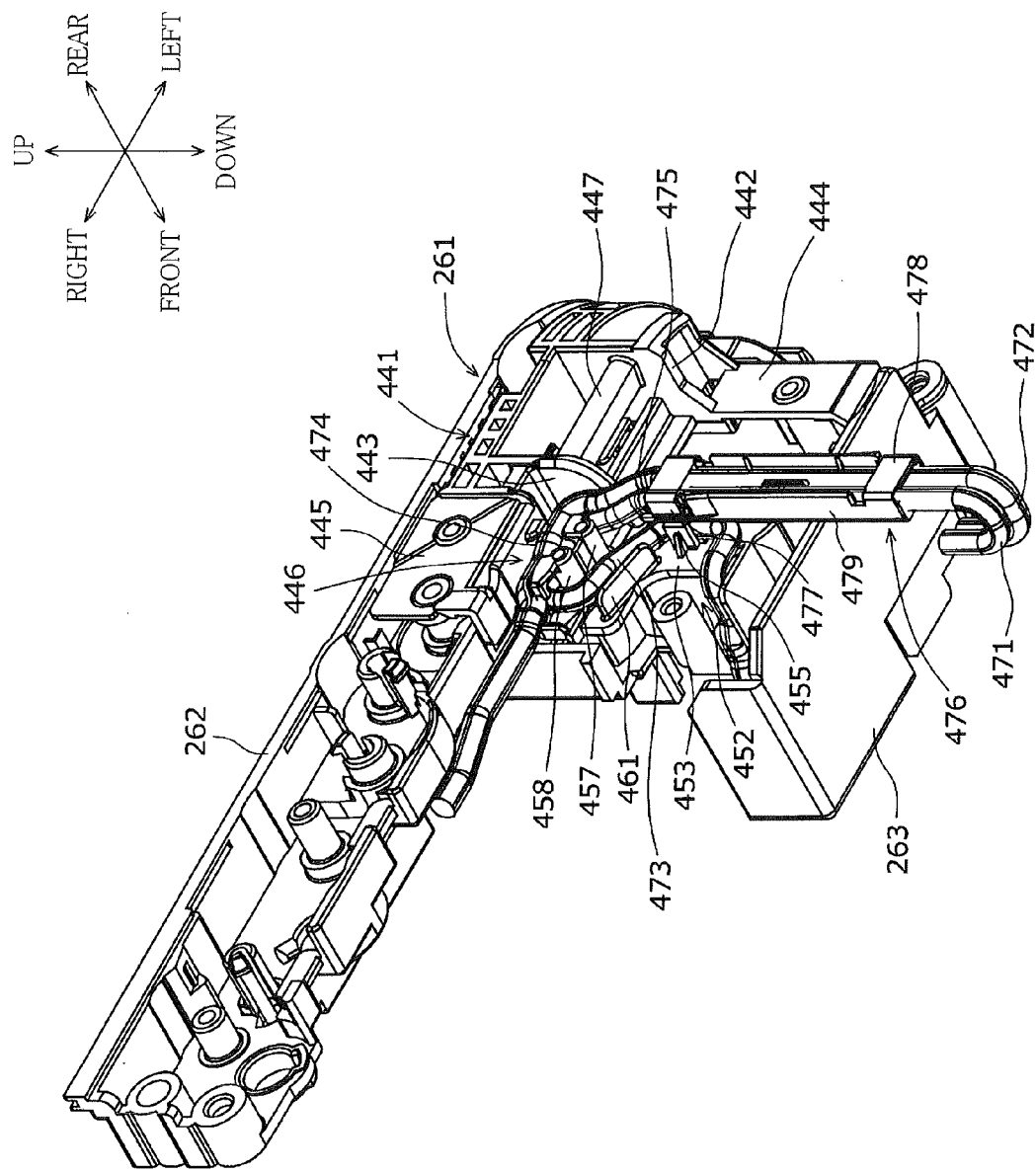
FIG. 5 is a perspective view illustrating the drive frame 261 when viewed from the lower rear left side, with the harnesses 471, 472 being routed.

As illustrated in FIGS. 4 and 5, a harness support 441 is mounted on the drive frame 261.

Figure 8:
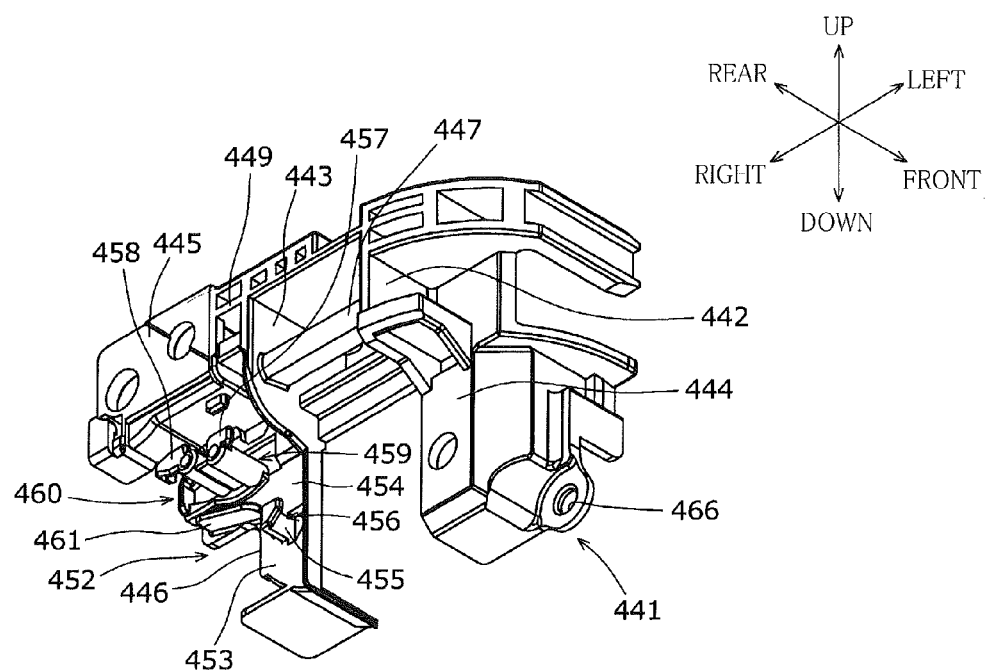
FIG. 8 is a perspective view illustrating the harness support 441 when viewed from the lower rear left side.

The harness support 441 is formed of resin and molded in one piece. As illustrated in FIG. 8, the harness support 441 integrally includes a first facing portion 442, a second facing portion 443, a first shaft holder 444, a second shaft holder 445, the harness routing portion 446, and a hinge mount portion 447.

It is noted that the drive frame 261 and the harness support 441 are one example of a cover, and the harness routing portion 446 is one example of a wall portion.

The first facing portion 442 and the second facing portion 443 have the same shape, i.e., a generally rectangular shape in side view. The first facing portion 442 and the second facing portion 443 face each other with a space therebetween in the right and left directions.

The first shaft holder 444 is disposed to the left of the first facing portion 442 and shaped like a generally rectangular plate that extends downward along the first facing portion 442.

The second shaft holder 445 is provided to the right of the second facing portion 443, with a distance between the second shaft holder 445 and an upper end portion of the second facing portion 443. The second shaft holder 445 is shaped like a rectangular plate elongated in the right and left directions. The second facing portion 443 and the second shaft holder 445 are connected to each other by a connecting portion 449.

The harness routing portion 446 is provided under the second shaft holder 445. The harness routing portion 446 is shaped like a thin wall extending in the up and down directions and the right and left directions. That is, the space in front of the harness routing portion 446 (as one example of the first space) and a space at a rear of the harness routing portion 446 (as one example of a second space) are located on opposite sides of the harness routing portion 446. A lower right end portion of the harness routing portion 446 has the rectangular cutout 452, and the harness routing portion 446 includes an upper portion 454 and a lower portion 453 whose width is smaller than that of the upper portion 454 in the right and left directions. Also, the cutout 452 is formed by cutting out the harness routing portion 446 leftward from its right edge, so that the cutout 452 opens rightward.

The lower portion 453 of the harness routing portion 446 is provided with a projecting portion 455. The projecting portion 455 extends rearward from the lower portion 453 and is bent leftward. The lower portion 453 and the projecting portion 455 form a recessed portion 456 that opens leftward.

Provided on the upper portion 454 of the harness routing portion 446 are a pair of hook portions 457, 458 that are spaced apart from each other in the right and left directions. The pair of hook portions 457, 458 are arranged next to each other in a direction parallel to the right and left directions (i.e., a direction parallel to the axis AX). The left hook portion 457 includes: a portion extending rearward from the upper portion 454; and a portion extending leftward from a distal end portion thereof and bent frontward. The upper portion 454 and the hook portion 457 form a recessed portion 459 that opens leftward. The right hook portion 458 includes: a portion extending rearward from the upper portion 454; and a portion extending rightward from a distal end portion thereof and bent frontward. The upper portion 454 and the hook portion 458 form a recessed portion 460 that opens rightward. A guide portion 461 is provided on the upper portion 454 and projects rearward from a position located between the projecting portion 455 and the right hook portion 458. The guide portion 461 is shaped like a rib extending in a slanting direction, i.e., the upper right direction. It is noted that the right hook portion 458 is disposed to the right of the projecting portion 455. Also, the left hook portion 457 is disposed to the left of the projecting portion 455.

As illustrated in FIG. 8, the hinge mount portion 447 is a square rod that is suspended between the first facing portion 442 and the second facing portion 443. A central axis of the hinge mount portion 447 is one example of a first pivot axis.

Figure 2:
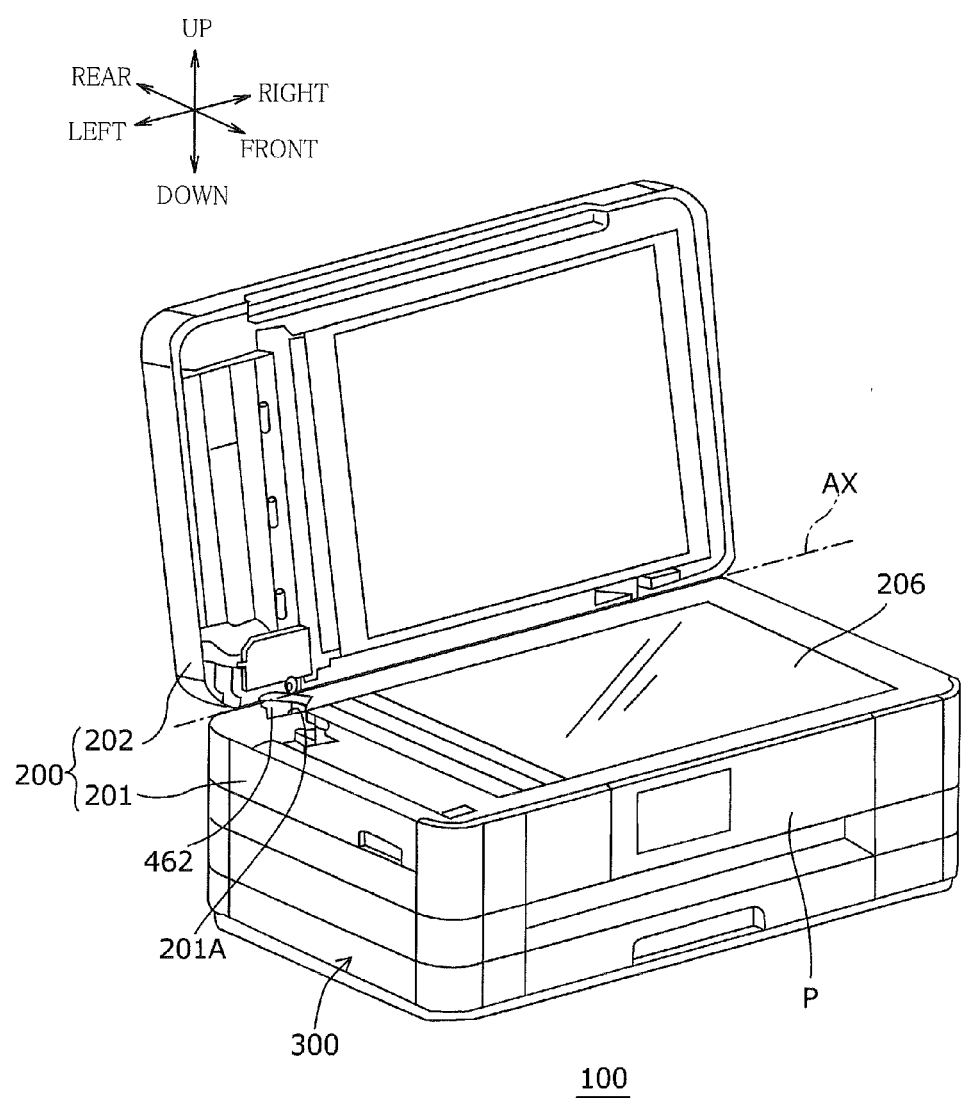
FIG. 2 is a perspective view illustrating the MFP 100 when viewed from the upper front left side, with the ADF 202 being opened.

As illustrated in FIG. 4, an upper end portion of the hinge member 462 is attached to the hinge mount portion 447, allowing the pivotal movement of the hinge member 462. A lower end portion of the hinge member 462 is connected to the image reading main body 201. As a result, the ADF 202 can be pivoted about the hinge mount portion 447 with respect to the image reading main body 201 between the position at which the ADF 202 is superposed on the image reading main body 201 as illustrated in FIG. 1 and the position at which the ADF 202 is open with respect to the image reading main body 201, with the front portion of the ADF 202 being raised as illustrated in FIG. 2.

As illustrated in FIG. 8, the harness support 441 has a screw hole 466. As illustrated in FIG. 4, the harness support 441 is secured to the drive frame 261 by a screw 428 fitted in the screw hole 466.

<Routing of Harness>

As illustrated in FIGS. 4 and 5, two harnesses 471, 472 are routed on the drive frame 261, for example.

As illustrated in FIGS. 6 and 7, one end of the harness 471 as one example of an electric wire is connected to the motor 269. The harness 471 extends in an upper rear right direction from the motor 269, is bent rightward, and then extends rightward. The harness 471 is then bent rearward, extends rearward, and finally passes through the cutout portion 270 of the wall portion 264 to a rear side of the wall portion 264.

Figure 9:
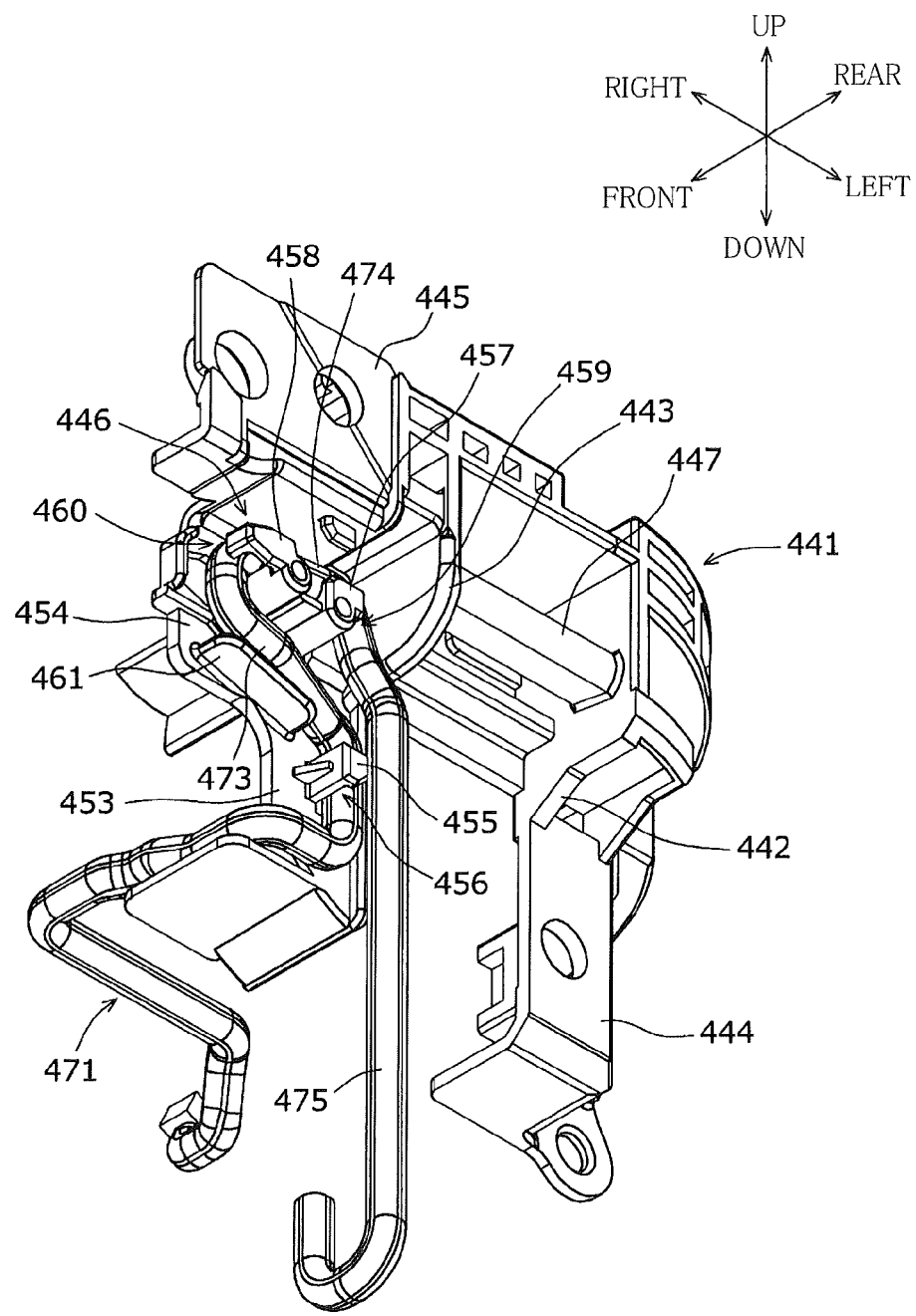
FIG. 9 is a perspective view illustrating the harness support 441 when viewed from the lower rear left side, with the ADF 202 being closed and the harness 471 being routed.

As illustrated in FIG. 9, a portion of the harness 471 which is drawn to a rear side of the wall portion 264 is routed to the harness routing portion 446 of the harness support 441. Specifically, the harness 471 is drawn from a front side to a rear side of the harness routing portion 446 through the cutout 452. The harness 471 is routed from a lower side to an upper side of the projecting portion 455 through the recessed portion 456. The harness 471 extends from the projecting portion 455 toward the right hook portion 458 along an upper face of the guide portion 461. The harness 471 passes through the recessed portion 460 formed between the upper portion 454 and the right hook portion 458, is routed to an upper side of the hook portion 458, and extends in the right and left directions over the pair of hook portions 457, 458. In the state in which the ADF 202 is superposed on the image reading main body 201, the harness 471 enters into the recessed portion 459 from an upper side of the left hook portion 457 and extends downward through the recessed portion 459.

In the state in which the ADF 202 is superposed on the image reading main body 201, the harness 471 includes: a detour portion 473 extending from the projecting portion 455 toward the right hook portion 458; a first extending portion 474 continuous from the detour portion 473 and extending in the right and left directions over the pair of hook portions 457, 458 along the central axis of the hinge mount portion 447; and a second extending portion 475 continuous from the first extending portion 474 and extending downward from the left hook portion 457. Opposite end portions of the first extending portion 474 in the right and left directions are respectively retained by the pair of hook portions 457, 458, so that the first extending portion 474 extends in the right and left directions between the pair of hook portions 457, 458.

Figure 10:
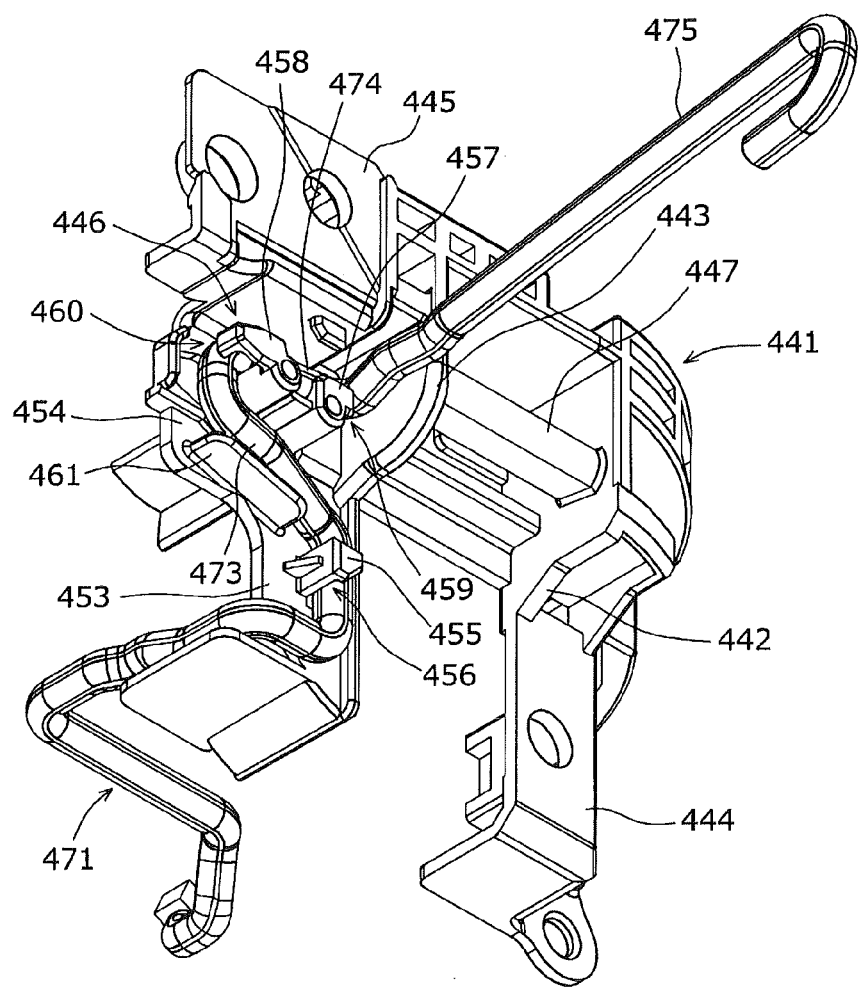
FIG. 10 is a perspective view illustrating the harness support 441 when viewed from the lower rear left side, with the ADF 202 being opened and the harness 471 being routed.

When the ADF 202 is pivoted 90 degrees from the position at which the ADF 202 is superposed on the image reading main body 201 to the position at which the ADF 202 is open, as illustrated in FIG. 10, the first extending portion 474 of the harness 471 is twisted 90 degrees, and the second extending portion 475 extends in a direction in which the hook portion 457 extends.

As illustrated in FIG. 5, the harness 472 extends rearward from a left portion of the harness support 441. The harness 472 extends in the right and left directions over the pair of hook portions 457, 458. In the state in which the ADF 202 is superposed on the image reading main body 201, the harness 472 is bent downward at the left of the left hook portion 457 and extends downward along and next to the second extending portion 475 of the harness 471.

A slack preventive member 476 covers the second extending portion 475 of the harness 471 and the portion of the harness 472 which extends next to the second extending portion 475. The slack preventive member 476 integrally includes two surrounding portions 477, 478 and a connecting portion 479. The two surrounding portions 477, 478 have the same shape. The surrounding portion 477 and the surrounding portion 478 are distant from each other. The connecting portion 479 connects the surrounding portion 477 and the surrounding portion 478 to each other. The harnesses 471, 472 are inserted through the two surrounding portions 477, 478, so as to be held by the slack preventive member 476.

The ADF 202 is pivotable upward and downward with respect to the image reading main body 201. In this pivot movement of the ADF 202, the harnesses 471, 472 are moved upward and downward with respect to the slack preventive member 476 in the state in which the harnesses 471, 472 are held by the slack preventive member 476. That is, the slack preventive member 476 prevents the harnesses 471, 472 from slacking at their portions covered by the slack preventive member 476, preventing the harnesses 471, 472 from being pinched between the image reading main body 201 and the ADF 202.

Also, as illustrated in FIG. 4, a flexible flat cable (FFC) 451 is drawn from the ADF 202 to a rear side of the drive frame 261. The FFC 451 is located to the left of the harnesses 471, 472 and extends downward.

<Holder>

Figure 11:
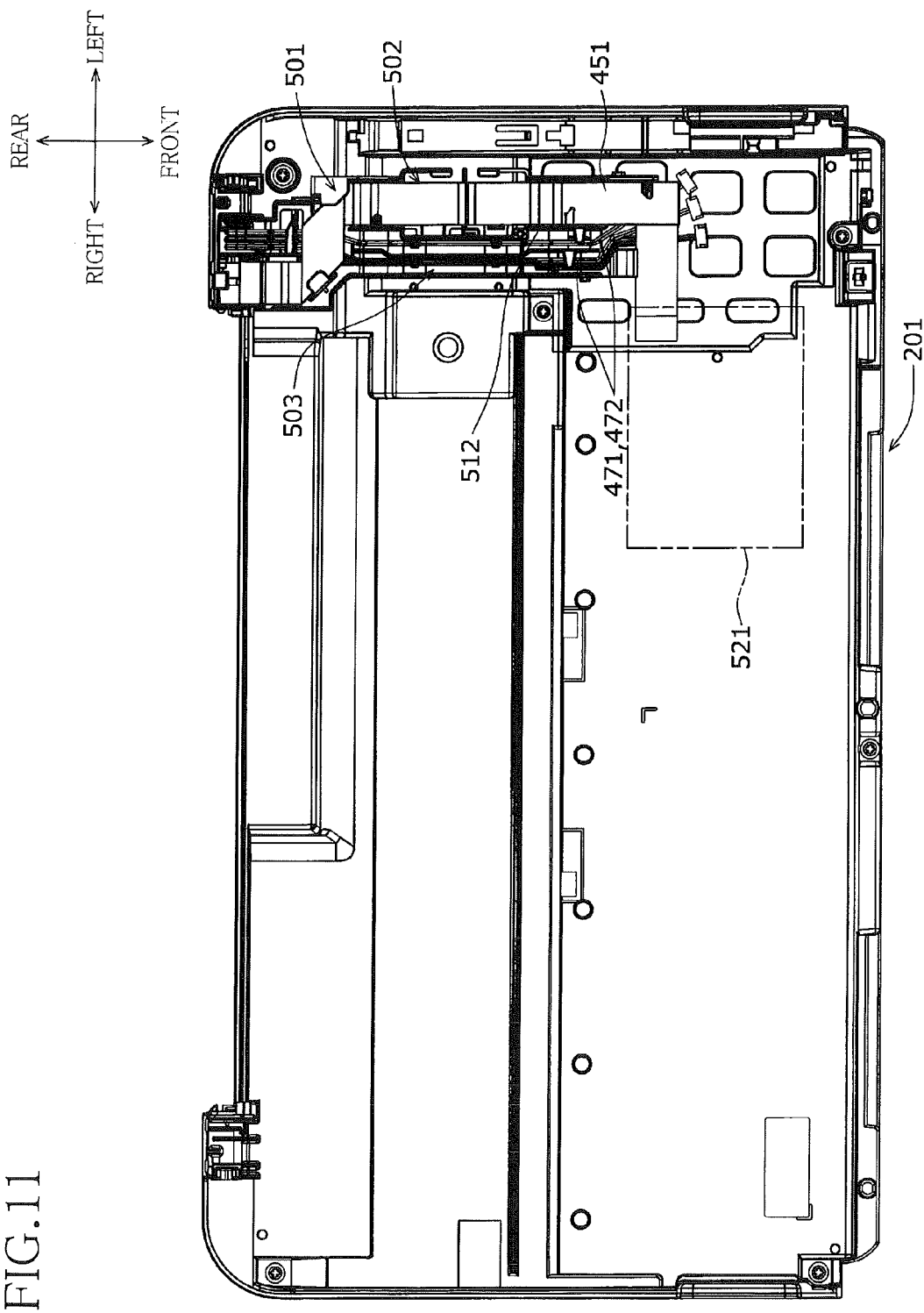
FIG. 11 is a bottom view of an image reading main body 201.
Figure 12:
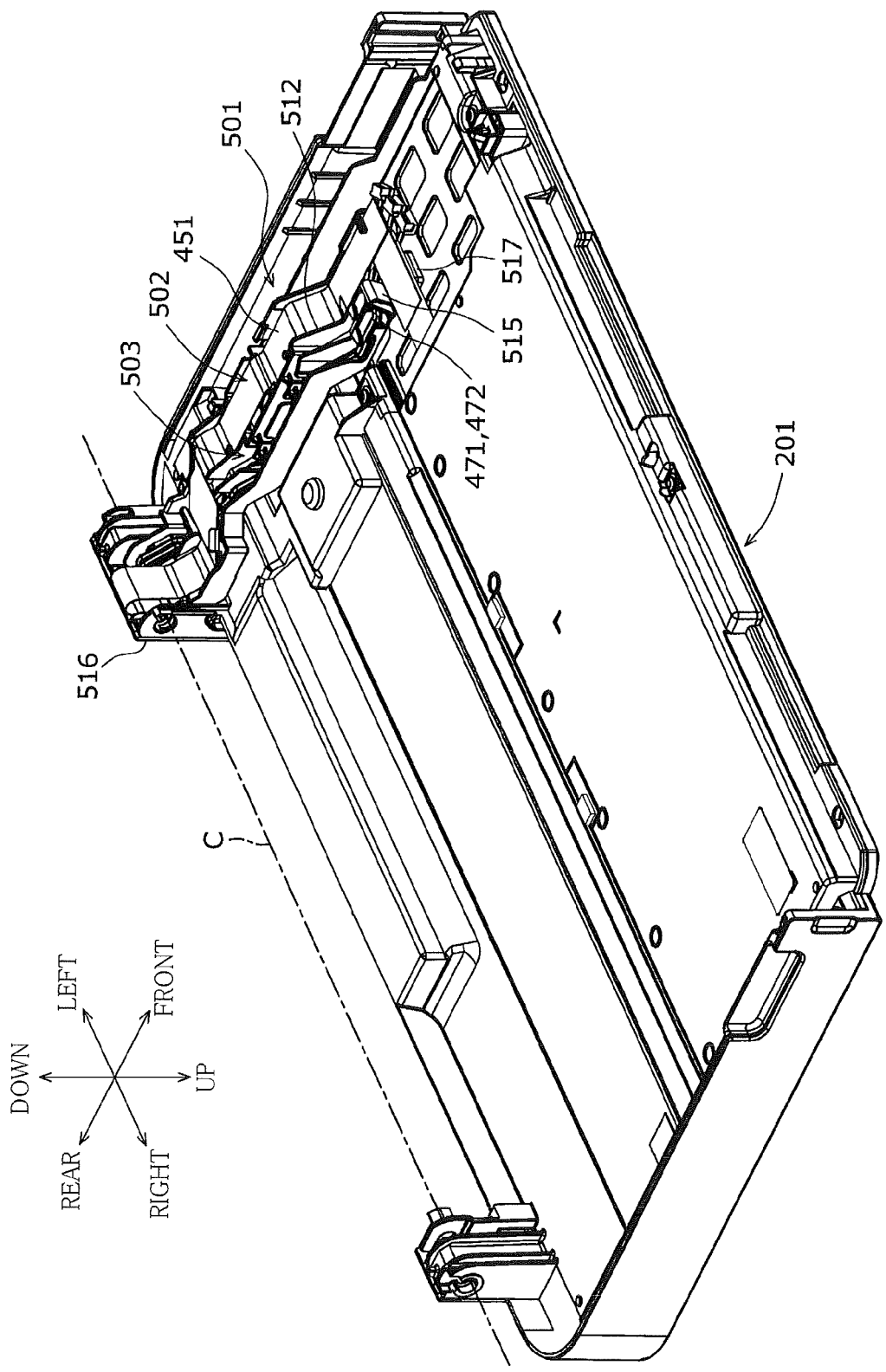
FIG. 12 is a perspective view illustrating the image reading main body 201 when viewed from the lower front right side, with a holder 501 being secured to the image reading main body 201.
Figure 13:
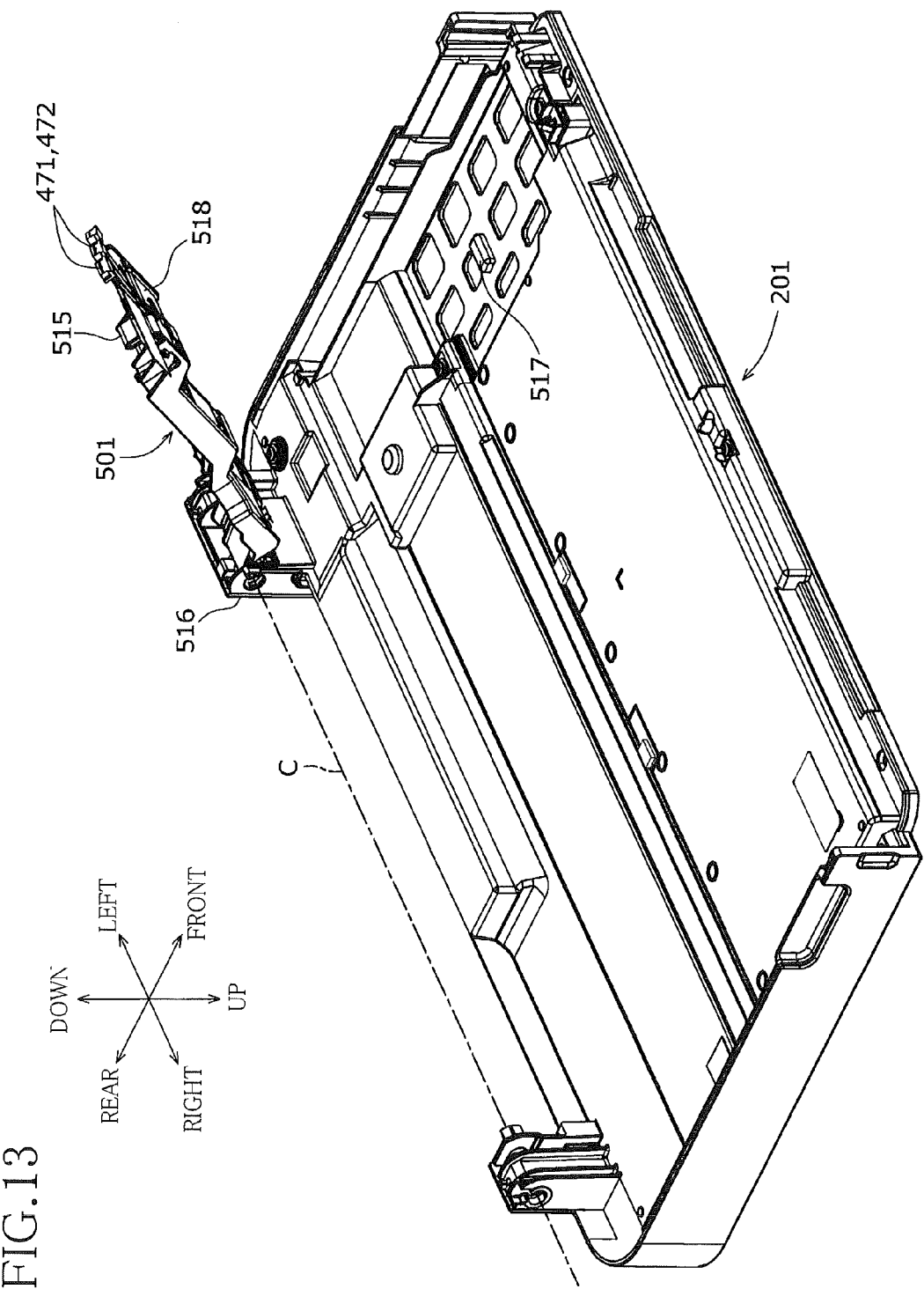
FIG. 13 is a perspective view illustrating the image reading main body 201 when viewed from the lower front right side, without the holder 501 being secured to the image reading main body 201.

As illustrated in FIGS. 11, 12, and 13, a holder 501 is provided on a left end portion of a lower face of the image reading main body 201.

Figure 14:
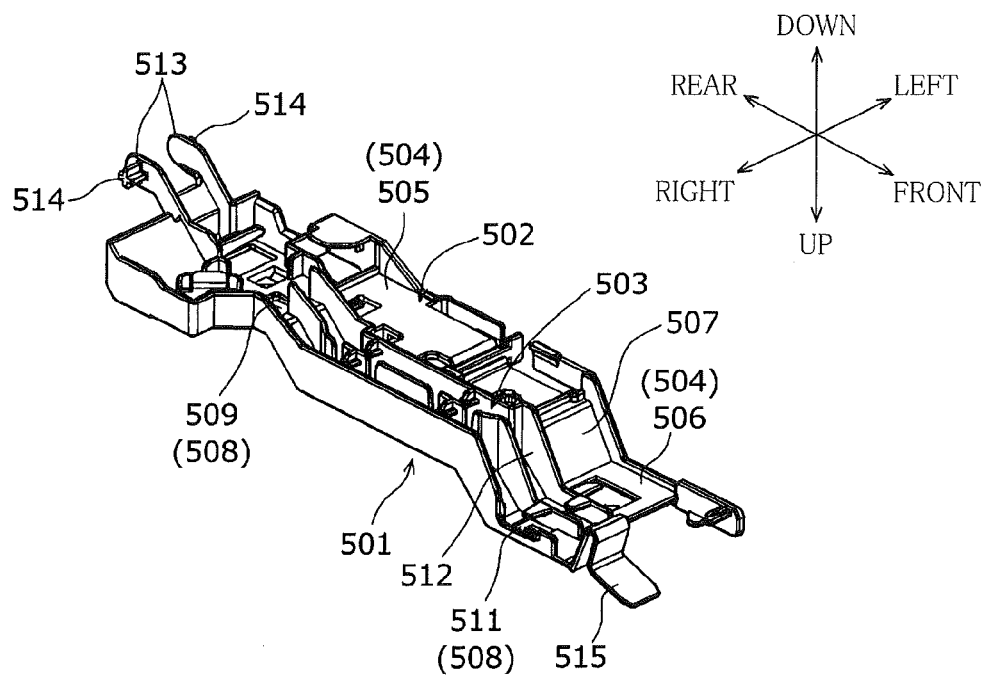
FIG. 14 is a perspective view illustrating the holder 501 when viewed from the lower front right side.
Figure 15:
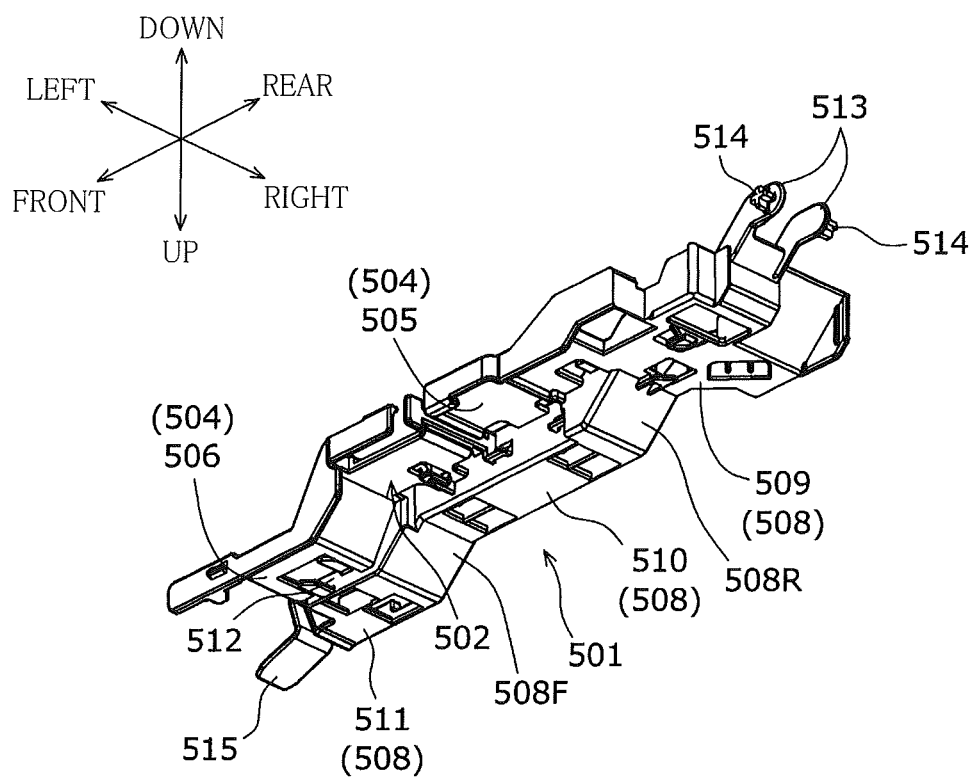
FIG. 15 is a perspective view illustrating the holder 501 when viewed from the upper front right side.

The holder 501 is formed of resin and molded in one piece. As illustrated in FIGS. 14 and 15, the holder 501 includes an FFC holding portion 502 and a harness holding portion 503.

The FFC holding portion 502 includes a divider plate 504 extending in the front and rear directions. The divider plate 504 includes a step 507 provided in front of a central portion of the divider plate 504 in the front and rear directions. The divider plate 504 includes: a portion 505 provided at a rear of the step 507; and a portion 506 provided in front of the step 507. The portion 505 is one step lower than the portion 506 in a state in which the holder 501 extends horizontally.

The harness holding portion 503 is provided on a right side of the FFC holding portion 502. The harness holding portion 503 includes a bottom plate 508 extending in the front and rear directions. The bottom plate 508 includes steps 508F, 508R formed at two different positions in the front and rear directions. As a result, the bottom plate 508 includes three portions 509, 510, 511, with the steps 508F, 508R serving as boundaries. In the state in which the holder 501 extends horizontally, the portion 509 located at the rear most position is located at the lowest position, the portion 510 located at a central position is located higher than the portion 509, and the portion 511 located at the frontmost position is located at the highest position.

The holder 501 further includes a partition wall 512. The partition wall 512 extends in the up and down directions and the front and rear directions along a boundary between the divider plate 504 and the bottom plate 508.

The holder 501 further includes a pair of mount portions 513 that are opposite each other in the right and left directions. Each of the pair of mount portions 513 is shaped like a plate that extends in a lower rear direction from a rear edge of the divider plate 504. Each of the mount portions 513 has a distal end portion on which is formed a corresponding one of shaft portions 514 extending outward in the right and left directions.

The holder 501 further includes an engaging portion 515. The engaging portion 515 is continuous from a front edge of the bottom plate 508. The engaging portion 515 extends downward from the front edge of the bottom plate 508, is flexed or bent so as to extend upward, and is bent so as to extend frontward.

As illustrated in FIGS. 12, 13, and 14, the shaft portions 514 are pivotably held by a shaft holder 516 provided on a rear left end portion of the image reading main body 201, so that the holder 501 is pivotable about a pivot axis C as one example of a second pivot axis.

Figure 16:
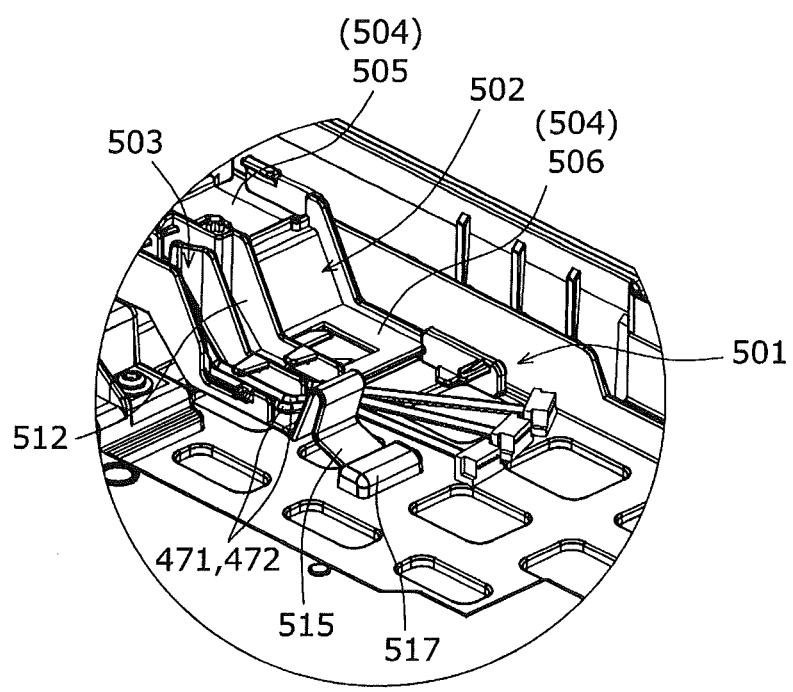
FIG. 16 is a perspective view illustrating a portion of the holder 501 when viewed from the lower front right side, which portion includes an engaging portion 515.

As illustrated in FIGS. 13 and 16, formed on the lower face of the image reading main body 201 is a retaining portion 517 shaped like a bag that opens rearward. As illustrated in FIG. 16, a distal end portion of the engaging portion 515 is inserted into the retaining portion 517, so that the engaging portion 515 is retained by the retaining portion 517, and thereby the holder 501 is secured to the lower face of the image reading main body 201. Accordingly, where the engaging portion 515 is retained by the retaining portion 517 upon transportation of the image reading device 200, the holder 501 does not swing, facilitating handling of the image reading device 200.

As illustrated in FIG. 11, the harnesses 471, 472 drawn from the ADF 202 pass through a rear end portion of the harness holding portion 503 and extend frontward along the bottom plate 508 of the harness holding portion 503. As a result, the harness holding portion 503 of the holder 501 holds a portion of the harness 471 which extends from the second extending portion 475 toward an opposite side of the second extending portion 475 from the first extending portion 474. Also, the FFC 451 drawn from the ADF 202 passes through a rear end portion of the FFC holding portion 502 and extends frontward along a lower face of the divider plate 504 of the FFC holding portion 502. Also, an FFC 518 extends from the image reading main body 201, passes through the rear end portion of the FFC holding portion 502, and extends frontward along an upper face of the divider plate 504 of the FFC holding portion 502.

As illustrated in FIG. 11, distal ends of the harnesses 471, 472 and the FFCs 451, 518 are connected to a control board 521 as one example of a first electric component. The control board 521 is provided in the image forming device 300, for example.

<Effects>

As described above, the ADF 202 is pivotable with respect to the image reading main body 201 about the pivot axis extending in the right and left directions, i.e., about the central axis of the hinge mount portion 447. The ADF 202 includes the motor 269 to which the harness 471 is connected. The other end of the harness 471 is connected to the control board 521 provided in the image forming device 300.

The harness 471 includes the first extending portion 474 and the second extending portion 475. The first extending portion 474 is retained by the harness support 441 mounted on the drive frame 261 of the ADF 202 and extends in the right and left directions. The second extending portion 475 is provided freely with respect to the ADF 202 and extends from the first extending portion 474 toward the image reading main body 201.

With this construction, the first extending portion 474 of the harness 471 is twisted by the pivotal movement of the ADF 202. In a construction in which the harness 471 is bent (flexed) and straightened (stretched), its bent and straightened portion gets fatigued easily owing to stress concentration. In the construction in which the first extending portion 474 is twisted, on the other hand, a stress (i.e., fatigue) caused by the twist of the harness 471 is distributed over an entirety of the first extending portion 474.

Also, no space is required for the twist of the first extending portion 474.

This construction can reduce stress concentration of the harness with the opening and closing the ADF 202 without increase in size of the image reading device 200, making it possible to extend a useful life of the harness.

A center of the twist of the harness 471 is located on the central axis of the hinge mount portion 447.

This construction prevents portions of the harness 471 other than the portion to be twisted from being bent and straightened with the opening and closing of the ADF 202.

The harness 471 passes through the cutout 452 formed in the harness routing portion 446 of the harness support 441 provided in the ADF 202 and is routed from the space in front of the harness routing portion 446 to the space at a rear of the harness routing portion 446.

This construction allows the harness 471 to be routed easily when compared with a construction in which the harness routing portion 446 has a through hole through which the harness 471 is routed from the space in front of the harness routing portion 446 to the space at a rear of the harness routing portion 446.

The cutout 452 opens rightward.

Accordingly, the harness 471 can be inserted into the cutout 452 from a right side thereof.

The image reading device 200 includes: the hinge member 462 pivotably connecting between the image reading main body 201 and the ADF 202; and the projecting portion 455 provided on the wall portion 264 and projecting rearward. The harness 471 is retained by the projecting portion 455 and includes the detour portion 473 extending away from the hinge member 462.

Since the detour portion 473 extends away from the hinge member 462, it is possible to prevent the harness 471 being pinched between the hinge member 462 and the ADF 202 when the ADF 202 is closed.

Also, the pair of hook portions 457, 458 projecting rearward from the wall portion 264 are provided on the ADF 202 and spaced apart from each other in the right and left directions. The portion of the harness 471 which is continuous to the detour portion 473 is retained by the pair of hook portions 457, 458.

This construction allows the ADF 202 to retain the harness 471 easily. Also, the first extending portion 474 extending in the right and left directions can be easily formed.

The recessed portion 459 that opens leftward is formed between the upper portion 454 and the hook portion 457 of the harness routing portion 446. Also, the recessed portion 460 that opens rightward is formed between the upper portion 454 and the hook portion 458.

Accordingly, the harness 471 can be fitted in the recessed portion 459 from a left side thereof and fitted in the recessed portion 460 from a right side thereof to have the harness 471 be retained by the pair of hook portions 457, 458 easily.

The guide portion 461 projecting rearward is provided between the projecting portion 455 and the right hook portion 458 to guide the routing of the harness 471.

In the routing of the harness 471, the guide portion 461 can guide the harness 471 from the projecting portion 455 to the hook portion 458, facilitating the routing of the harness 471.

The slack preventive member 476 is provided to cover the second extending portion 475 of the harness 471 and the portion of the harness 472 which extends next to the second extending portion 475.

Specifically, the slack preventive member 476 integrally includes the two surrounding portions 477, 478 and a connecting portion 479. The surrounding portion 477 and the surrounding portion 478 are distant from each other. The connecting portion 479 connects the surrounding portion 477 and the surrounding portion 478 to each other. The harnesses 471, 472 are inserted through the two surrounding portions 477, 478, so as to be held by the slack preventive member 476.

In the pivot movement of the ADF 202, the harnesses 471, 472 are moved upward and downward with respect to the slack preventive member 476 in the state in which the harnesses 471, 472 are held by the slack preventive member 476. That is, the slack preventive member 476 prevents the harnesses 471, 472 from slacking at their portions covered by the slack preventive member 476, preventing the harnesses 471, 472 from being pinched between the image reading main body 201 and the ADF 202.

The holder 501 is provided on the image reading main body 201 so as to be pivotable about the pivot axis C extending in the right and left directions. The holder 501 includes the harness holding portion 503 for holding the harnesses 471, 472.

Since the harness 471 is held by the harness holding portion 503, the routing of the harness 471 can be performed more easily.

The harness holding portion 503 includes the step 508F at its middle portion. In the state in which the harness 471 is connected to the control board 521, the portion 511 that is nearer to the control board 521 than the step 508F is one step higher than the portions 509, 510 that are farther from the control board 521 than the step 508F.

Accordingly, even if water gets on the holder 501, the water does not flow to the control board 521 along the holder 501, preventing the control board 521 from getting wet.

<Modifications>

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiment, the image reading device 200 and the image forming device 300 are combined together to provide the MFP 100. However, the image reading device 200 alone can provide a scanner.

What is claimed is:

1. An image reading apparatus, comprising:
   a housing;
   a cover pivotable with respect to the housing about a first pivot axis;
   a first electric component provided in the housing;
   a second electric component provided in the cover; and
   an electric wire configured to electrically connect the first electric component and the second electric component to each other,
   the electric wire comprising:
      a first extending portion retained by the cover and extending in a first direction in which the first pivot axis extends; and
      a second extending portion movable relative to the cover and extending from the first extending portion toward the housing.

2. The image reading apparatus according to claim 1, further comprising a wall portion provided on the cover and extending parallel to the first pivot axis,
   wherein a first space and a second space are respectively located on opposite sides of the wall portion, and the electric wire is routed from the first space to the second space.

3. The image reading apparatus according to claim 2,
   wherein a cutout is formed in the wall portion, and
   wherein the electric wire is routed from the first space to the second space through the cutout.

4. The image reading apparatus according to claim 3, wherein the cutout opens in the first direction.

5. The image reading apparatus according to claim 4, wherein the second electric component is disposed in the first space at a position located on a side of the cutout in a second direction which is opposite the first direction.

6. The image reading apparatus according to claim 2, further comprising:
   a hinge member configured to connect the housing and the cover to each other and allow pivotal movement of the cover with respect to the housing; and
   a projecting portion provided on the wall portion and projecting to the second space,
   wherein the electric wire comprises a detour portion retained by the projecting portion and extending away from the hinge member.

7. The image reading apparatus according to claim 6,
   wherein a cutout is formed in the wall portion,
   wherein the electric wire is routed from the first space to the second space through the cutout,
   wherein the second electric component is disposed in the first space at a position located on a side of the cutout in a second direction than the first direction, and
   wherein the projecting portion is disposed on a side of the cutout in said second direction.

8. The image reading apparatus according to claim 6, further comprising a pair of hook portions provided on the wall portion, the pair of hook portions being arranged next to each other and spaced apart from each other in the first direction, the pair of hook portions projecting to the second space,
   wherein the electric wire comprises a portion continuous to the detour portion, which portion is retained by the pair of hook portions.

9. The image reading apparatus according to claim 8, wherein opposite end portions of the first extending portion in the first direction are respectively retained by the pair of hook portions, and the first extending portion extends in the first direction between the pair of hook portions.

10. The image reading apparatus according to claim 8,
    wherein a second direction is an opposite direction to the first direction,
    wherein the pair of hook portions is constituted by a first-direction-side hook portion and a second-direction-side hook portion that is located on a side of the first-direction-side hook portion in the second direction,
    wherein the first-direction-side hook portion comprises a first-direction-side recessed portion formed between the first-direction-side hook portion and the wall portion, and the first-direction-side recessed portion opens in the first direction, and
    wherein the second-direction-side hook portion comprises a second-direction-side recessed portion formed between the second-direction-side hook portion and the wall portion, and the second-direction-side recessed portion opens in the second said another direction.

11. The image reading apparatus according to claim 10, wherein the first-direction-side hook portion is disposed on a side of the projecting portion in the first direction.

12. The image reading apparatus according to claim 10, further comprising a guide portion provided on the wall portion at a position between the projecting portion and the first-direction-side hook portion, the guide portion projecting to the second space to guide routing of the electric wire.

13. The image reading apparatus according to claim 1, further comprising a slack preventive member provided on the second extending portion of the electric wire.

14. The image reading apparatus according to claim 1, further comprising a holder pivotable with respect to the housing about a second pivot axis extending in the first direction, the holder being configured to hold a portion of the electric wire which portion extends from an end portion of the second extending portion, the end portion being located on an opposite side of the second extending portion from the first extending portion.

15. The image reading apparatus according to claim 14,
wherein the holder comprises a step, a first portion, and a second portion which are located on the same side of the first electric component,
wherein, in a state in which the electric wire is electrically connected to the first electric component, a distance between the first electric component and the first portion is less than a distance between the first electric component and the step, and a distance between the first electric component and the step is less than a distance between the first electric component and the second portion, and
wherein a height level of the first portion is higher than that of the second portion.

16. An image reading apparatus, comprising:
a housing;
a cover pivotable with respect to the housing about a first pivot axis;
a first electric component provided in the housing;
a second electric component provided in the cover;
an electric wire configured to connect the first electric component and the second electric component to each other;
a wall portion provided on the cover and extending parallel to the first pivot axis, wherein a first space and a second space are respectively located on opposite sides of the wall portion; and
a hinge member configured to connect the housing and the cover to each other and allow pivotal movement of the cover with respect to the housing,
wherein the electric wire comprises a portion that is twisted by pivotal movement of the cover, and the electric wire is routed from the first space to the second space,
wherein the image reading apparatus comprises a projecting portion provided on the wall portion and projecting to the second space, and
wherein the electric wire comprises a detour portion retained by the projecting portion and extending away from the hinge member.

17. The image reading apparatus according to claim 16, wherein a center of the twist of the electric wire is located on the first pivot axis.

18. The image reading apparatus according to claim 16, further comprising a pair of hook portions provided on the wall portion, the pair of hook portions being arranged next to each other and spaced apart from each other in a first direction in which the first pivot axis extends, the pair of hook portions projecting to the second space,
wherein the electric wire comprises a portion continuous to the detour portion, which portion is retained by the pair of hook portions.

19. The image reading apparatus according to claim 18, wherein opposite end portions of the first extending portion in the first direction are respectively retained by the pair of hook portions, and the first extending portion extends in the first direction between the pair of hook portions.

20. The image reading apparatus according to claim 18,
wherein a second direction is an opposite direction to the first direction,
wherein the pair of hook portions is constituted by a first-direction-side hook portion and a second-direction-side hook portion that is located on a side of the first-direction-side hook portion in the second direction,
wherein the first-direction-side hook portion comprises a first-direction-side recessed portion formed between the first-direction-side one direction side hook portion and the wall portion, and the first-direction-side recessed portion opens in the first direction, and
wherein the second-direction-side hook portion comprises a second-direction-side recessed portion formed between the second-direction-side hook portion and the wall portion, and the second-direction-side recessed portion opens in the second direction.

21. The image reading apparatus according to claim 20, further comprising a guide portion provided on the wall portion at a position between the projecting portion and the first-direction-side hook portion, the guide portion projecting to the second space to guide routing of the electric wire.

* * * * *